July 8, 1941.    J. W. ANDERSON    2,248,565
WINDSHIELD WIPER
Filed Oct. 15, 1938
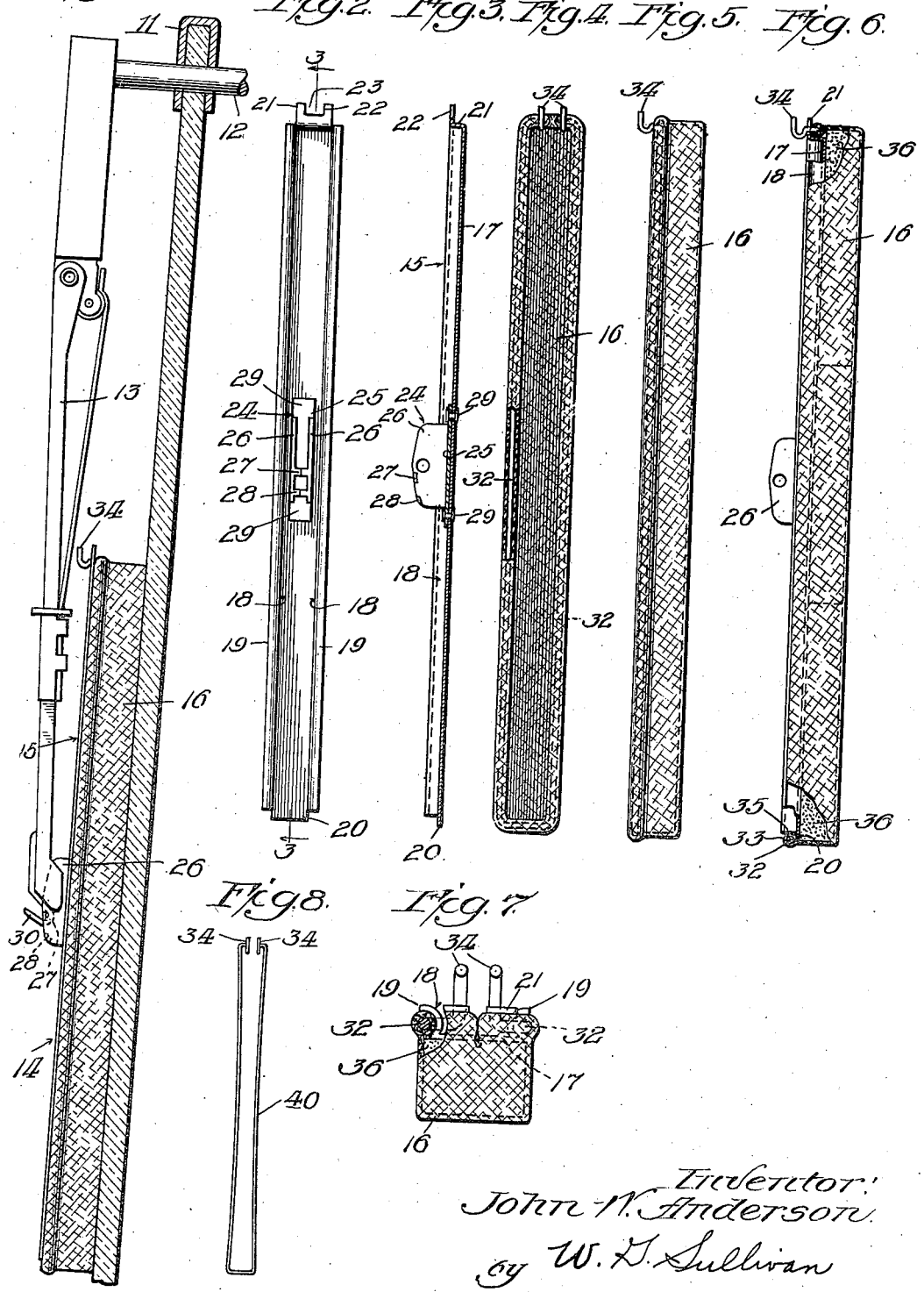
Inventor:
John W. Anderson
by W. G. Sullivan
Atty.

Patented July 8, 1941

2,248,565

UNITED STATES PATENT OFFICE 2,248,565

WINDSHIELD WIPER

John W. Anderson, Gary, Ind., assignor to Productive Inventions, Inc., Gary, Ind., a corporation of Indiana Application October 15, 1938, Serial No. 235,170

7 Claims. (Cl. 15—250.3)

This invention relates to windshield wipers, and more particularly to windshield wipers adapted to remove ice, sleet, snow and the like from a windshield by a combined wiping and melting action.

The device of my invention is of the general type comprising an actuating arm and a wiping element containing a salt compound or similar substance which reacts with water to effect a melting action on ice, sleet and snow which the wiping element contacts. The salt compound is usually contained in a water-pervious flexible receptacle which tends to collapse as the salt compound is diminished. However, since the flexible receptacle is necessarily supported by a rigid frame and is resiliently pressed towards the windshield, the windshield tends to become scratched through contact with the frame due to collapsing of the receptacle.

Additionally, prior windshield wipers of this type with which I am familiar are relatively expensive to manufacture and assemble partially due to the fact that the receptacle must be made accessible for refilling with salt compound or the like.

I have devised a windshield wiper of the above general type which is of relatively simple construction comprising relatively few parts and wherein the parts are largely susceptible of manufacture by stamping and punching operations. The receptacle may be quickly and easily secured to and detached from a support element although prevented from being accidentally displaced during operation of the wiper. Further, rigid or metallic parts are effectively cushioned and prevented from contacting the windshield glass due to collapsing of the flexible receptacle as the ice-melting material is diminished.

It is an object of my invention therefore to provide an improved windshield wiper having a wiping element of the ice-melting type which is relatively inexpensive to manufacture and assemble.

Another object of my invention is to provide an improved windshield wiper comprising a flexible container for ice-melting material and wherein the windshield glass is prevented from contacting relatively rigid or metallic parts of the wiper due to collapsing of the container and resultantly eliminating any tendency to scratch or mar the windshield.

Another object of my invention is to provide an improved windshield wiper of the above type wherein the flexible container may be easily detached from a support therefor for refilling with ice-melting material.

Another object of my invention is to provide an improved flexible container for ice-melting material adapted to be easily secured to and detached from a support therefor.

Another object of my invention is to provide an improved flexible container for ice-melting material adapted to be secured to a windshield wiper arm or the like and having improved means preventing contact of movable metallic or rigid parts with the windshield.

Another object of my invention is to provide a flexible container for ice-melting material and a rigid support therefor having improved means for detachably securing the container to the support.

Another object of my invention is to provide an improved refillable flexible container for ice-melting material.

Another object of my invention is to provide improved support means for a flexible container for ice-melting material adapted to be actuated by a windshield wiper arm.

Another object of my invention is to provide a windshield wiper of the above type wherein the flexible container is provided with an opening therein for filling with salt compound or the like and the container support forms a closure means for said opening.

Other objects of my invention itself will become increasingly apparent from a consideration of the following description and drawing wherein:

Fig. 1 is an elevational view of a windshield wiper of my invention applied to a windshield (shown in section);

Fig. 2 is a plan view of a support element I may employ in the embodiment of my invention illustrated in Fig. 1;

Fig. 3 is a section along the line 3—3 of Fig. 2;

Fig. 4 is a plan view of a receptacle I may employ with the element of Fig. 2 and with parts broken away for clearness of illustration;

Fig. 5 is an elevational view of the receptacle of Fig. 4;

Fig. 6 is an elevational view of the support element and receptacle in assembled relation and with parts broken away for clearness of illustration;

Fig. 7 is a top plan view of the receptacle and support element illustrated in Fig. 6; and Fig. 8 is a plan view of a modified form of frame element I may employ with the bag of Figs. 4 and 5.

Referring now to the drawing, I have indicated at 10 a conventional windshield of a vehicle and at 11 a supporting frame therefor forming a bearing for an actuating shaft 12. Secured to shaft 12 in any suitable manner is a wiper arm 13 adapted to be oscillated by the shaft in the usual manner and to be resiliently urged toward the windshield.

Detachably secured to the lower end of arm 13 is a wiping element generally indicated at 14. The wiping element 14 comprises a support 15 and a water-pervious flexible receptacle or bag 16. The support 15, best shown in Figs. 2 and 3, is generally of channel form comprising a base 17, side walls 18—18 and laterally outwardly extending flanges 19—19. Base 17 is extended at one end beyond the termination of side walls 18 to form a tongue 20. The opposite end portion of base 17 is bent upwardly and axially outwardly as indicated at 21, or is of generally inverted L form. A notch 23 is provided in portion 21 intermediate fingers 22.

Fixedly secured to support 15 generally centrally thereof is an arm attaching clip 24 of any suitable form, the clip in the present instance comprising a base 25 and upstanding walls 26—26. The walls are provided with axially spaced pairs of inturned ears 27 and 28, the ears 27 forming a hook engaging bight portion and the ears 28 forming a hook abutment portion. The clip may be secured in any suitable manner to the support 15, rivets 29 being employed in the present instance.

The particular means for attachment of the support element to the arm constitutes no essential part of my invention and any desired construction may be used. For purposes of illustration, I have shown the arm 13 provided with a hook 30 detachably projected beneath ears 27 and extended outwardly between ears 27 and 28, the arm end portion also preferably being of channel form providing lateral walls adapted to engage clip walls 26. The parts so far described are preferably formed of suitable corrosive resistant material, such as stainless steel, and which is also resistant to the action of the salt compound employed when reacting with water.

The flexible container or bag 16 is preferably formed of water-pervious fabric and is generally rectangular in contour with an open top portion. A relatively rigid and generally rectangular frame element such as a wire 32 is associated with the top peripheral portion of bag 16 to maintain the bag in a desired shape and cooperate with locking means on support 15 to secure the bag to the support. Wire 32 may be secured to the bag in any suitable manner and as illustrated in Figs. 4 and 5 this is effected by sewing or otherwise securing peripheral portions of the bag to the bag walls to form a peripheral sheath portion as indicated at 33 having adjacent open ends disposed generally centrally of one end of the bag. It is understood that the wire or frame element 32 may be secured to bag 16 by clamp means, forming projections on the wire to which the bag fabric may be hooked or in various other ways although I preferably encase the wire and in each instance insure that at least the external side and end wall portions of the wire are covered by fabric to prevent any possibility of the frame element 32 contacting the windshield when the bag is collapsed. The ends of wire 32 are projected upwardly from the sheath ends in generally S form to provide clips 34.

The manner of securing bag 16 to support 15 will now be described and is best illustrated in Fig. 6. The tongue 20 of the support element is projected beneath wire 32 at the forward end of the bag, the projecting movement being limited by the forward ends of support walls 18 engaging the wire 32 to maintain tongue 20 slightly spaced from the forward end wall of the bag indicated at 35 and eliminating any possibility of tongue 20 injuring the fabric. The rear portion of bag 16 is brought into contact with the support 15 causing clips 34 to ride over and receive peripheral portions of notch 23 and I preferably provide sufficient resilience in wire 32 to cause clips 34 to spread laterally after entering notch 23. Thus, the bag 16 may be quickly and easily secured to support 15 with the longitudinally extending portions of wire 32 abutting support flanges 19 and the support base 17 extended into the bag. It will be apparent that due to the fabric covered wire 32 encircling the support 15 and disposed between the windshield and support flanges 19 and support portion 21 that there is no possibility of any portion of the support contacting the windshield upon collapse of the bag.

The bag may be detached from the support 15 for refilling by reversing the locking operation. Any suitable compound which will react with water to melt ice may be used although I preferably supply this material in solid rectangular units as indicated at 36. The support element forms a closure for bag 16 with support base 17 initially pressing units 36 firmly against the bag bottom.

It will be noted that side walls 18 of support 15 are of arcuate form or curved inwardly as shown in Fig. 7 whereby the longitudinally extending portions of frame element 32 are forced slightly apart when securing bag 16 to support 15 insuring that the bag will remain locked with the support at all portions thereof and cooperating with tongue 20 and clips 34 in effecting the locking action. Although I have shown walls 18 as of arcuate form, it is understood that they may be of planar form although in this construction I preferably employ a frame element as indicated at 40, Fig. 8. The frame element 40 is similar to frame element 17 but the longitudinally extending frame side portions are curved slightly inwardly to provide a gripping action on side walls 18 of the support 15.

It is understood that I may employ frame element 40 in association with a bag adapted to a support 15 having either planar or arcuate side walls 18.

Although I have shown and described preferred forms of my invention, it is understood that numerous and extensive departures may be made therefrom without departing from the spirit of my invention and the scope of the appended claims.

Having thus described my invention, I claim:

1. The combination of a generally channel form relatively rigid support having longitudinal flanges extending laterally outwardly, an upwardly open flexible water pervious bag of generally rectangular form adapted to be detachably secured to the support with longitudinal edge portions of the bag abutting the support flanges, and the base of said channel form being disposed within the bag to form a closure therefor.

2. The combination with a flexible bag adapted to contain ice-melting material, of generally rectangular relatively rigid frame means for the bag secured to the peripheral portions of the bag and being externally covered by the bag walls, and closure and support means for the bag having longitudinally outwardly extending flanges and longitudinally extending means at each end thereof detachably interlocking with the frame means to secure the bag to the support and to close the bag opening.

3. The combination with an upwardly open generally rectangular bag of water-pervious material adapted to contain ice-melting material, of a generally rectangular relatively rigid frame element secured to peripheral portions of the bag, at least the external side and end wall portions of the frame element being covered by the bag material, a rigid support element adapted to be secured to an actuating arm, and cooperating means on the frame element and support element for detachably securing the support element to the frame element with the support element closing the bag opening.

4. The combination comprising a support member adapted to be connected to a windshield wiper arm, an upwardly open bag of water-pervious material adapted to contain ice-melting material, said support cooperating with said bag to form a closure therefor, and a frame element connected to peripheral edge portions of said bag and being arranged to surround the edge of said support, said bag material being arranged to cover the outer portions of said frame to prevent contact of said support and said frame with a windshield as the bag is collapsed.

5. The combination of a rigid support element with a detachable upwardly open flexible bag formed of water-pervious material, said bag having a frame element provided with a pair of clips, said frame element connected to peripheral edge portions of said bag, said support having at one end thereof an element adapted to be projected beneath an end portion of said frame and locking means on the opposite end thereof cooperating with said frame clips to secure said bag to said support.

6. The combination with a generally channel form rigid support element adapted to be secured to a windshield wiper actuating arm, the support element side walls being inwardly concave, of a bag of water-pervious material adapted to contain ice-melting material, generally resilient frame means connected to the bag defining an opening therein adapted to have side portions thereof seat in the support element side walls, and means at one end of said support element for engaging said frame means, and means at the other end of the support element for detachably locking the bag and frame means to the support element.

7. The combination comprising a bag of water-pervious flexible material, generally resilient frame means secured to the bag and defining an opening therein, the longitudinal side portions of the frame means being bowed slightly inwardly, a generally channel form support element forming a closure for the bag, the support element having concave side walls with the frame means side portions resiliently interlocking with the sides of the support element, and means located at the ends of said support element for engaging the end portions of said frame for detachably securing the frame means to the support element.

JOHN W. ANDERSON.